United States Patent [19]
Cooley et al.

[11] Patent Number: 4,792,660
[45] Date of Patent: Dec. 20, 1988

[54] HUMIDIFIER CONTROLLER HAVING AUTOMATIC OVER-CURRENT CORRECTING MEANS

[75] Inventors: Stephen E. Cooley; Martin J. Jensen, both of Madison, Wis.

[73] Assignee: Carnes Company, Inc., Verona, Wis.

[21] Appl. No.: 842,780

[22] Filed: Mar. 21, 1986

[51] Int. Cl.⁴ ............................................. H05B 1/02
[52] U.S. Cl. .................................... 219/295; 219/272; 361/94
[58] Field of Search ............... 219/271, 272, 273, 275, 219/284, 286, 287, 295; 361/93, 94

[56] References Cited

U.S. PATENT DOCUMENTS

| | | | |
|---|---|---|---|
| 4,196,341 | 4/1980 | Williams | 219/295 |
| 4,262,191 | 4/1981 | Lepper et al. | 219/295 |
| 4,347,430 | 8/1982 | Howard-Leicester et al. | 219/295 |

*Primary Examiner*—A. D. Pellinen
*Assistant Examiner*—H. L. Williams
*Attorney, Agent, or Firm*—Michael, Best & Friedrich

[57] ABSTRACT

A controller, for controlling an electrode boiler steam humidifier includes a plurality of current loop transformers, coupled to the boiler electrodes, for sensing the current drawn by the electrode boiler. A current level detector provides a control voltage to a solenoid controlled valve, associated with the boiler, to drain a predetermined quantity of water from the boiler and thereby reduce the electrode current, when the electrode current exceeds a predetermined upper current limit. A resettable counter is provided for limiting the number of automatic attempts which can be made to reduce the electrode current. Normal periodic actuation of the humidistat resets the counter to avoid reaching the predetermined count through long-term acquisition of isolated over-current occurrences. During normal operation of the boiler, the time required for the electrode current to decrease between a pair of predetermined current levels is monitored and is compared against a known reference in order to provide a general indication of the condition of the boiler.

11 Claims, 6 Drawing Sheets

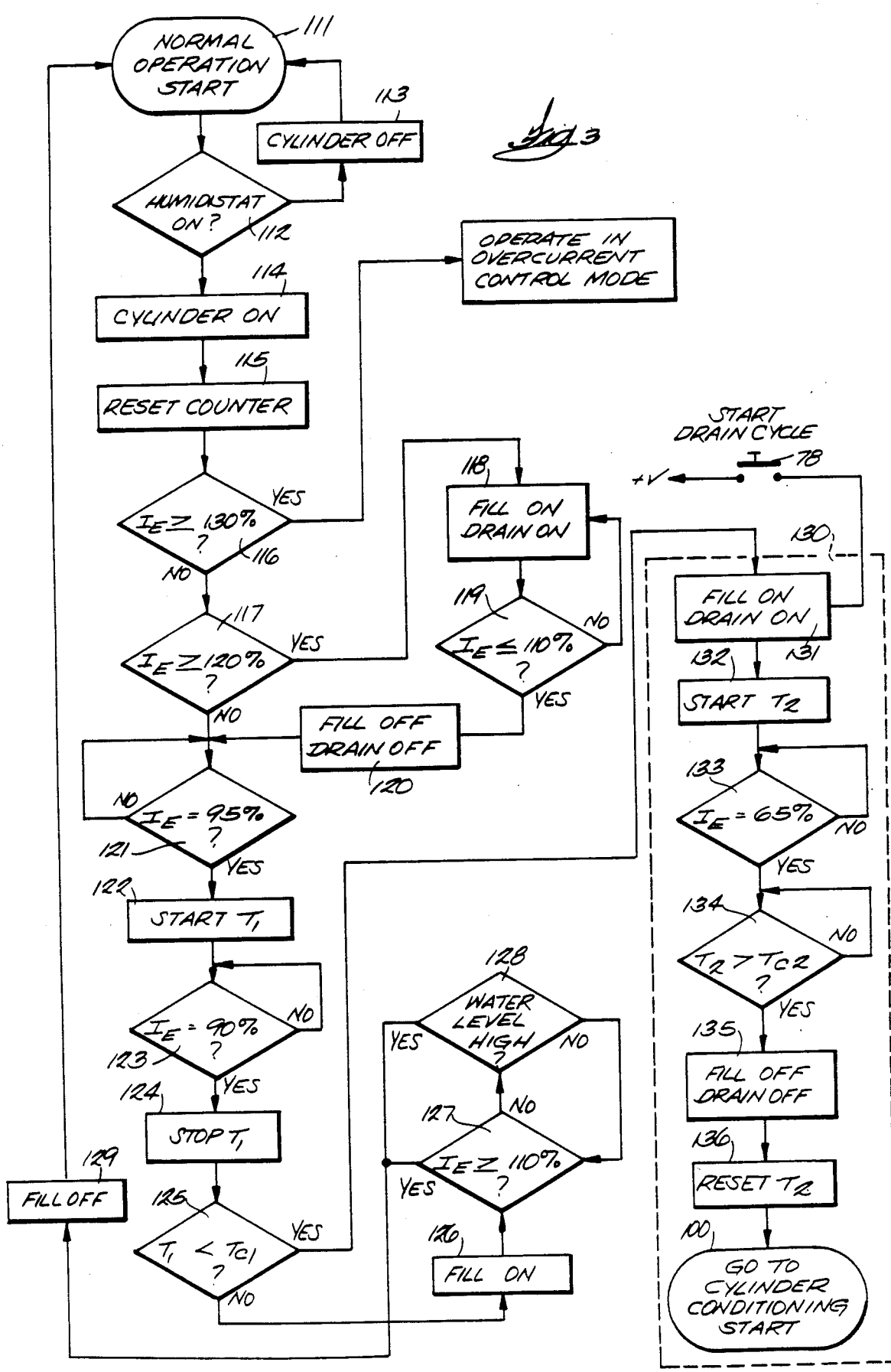

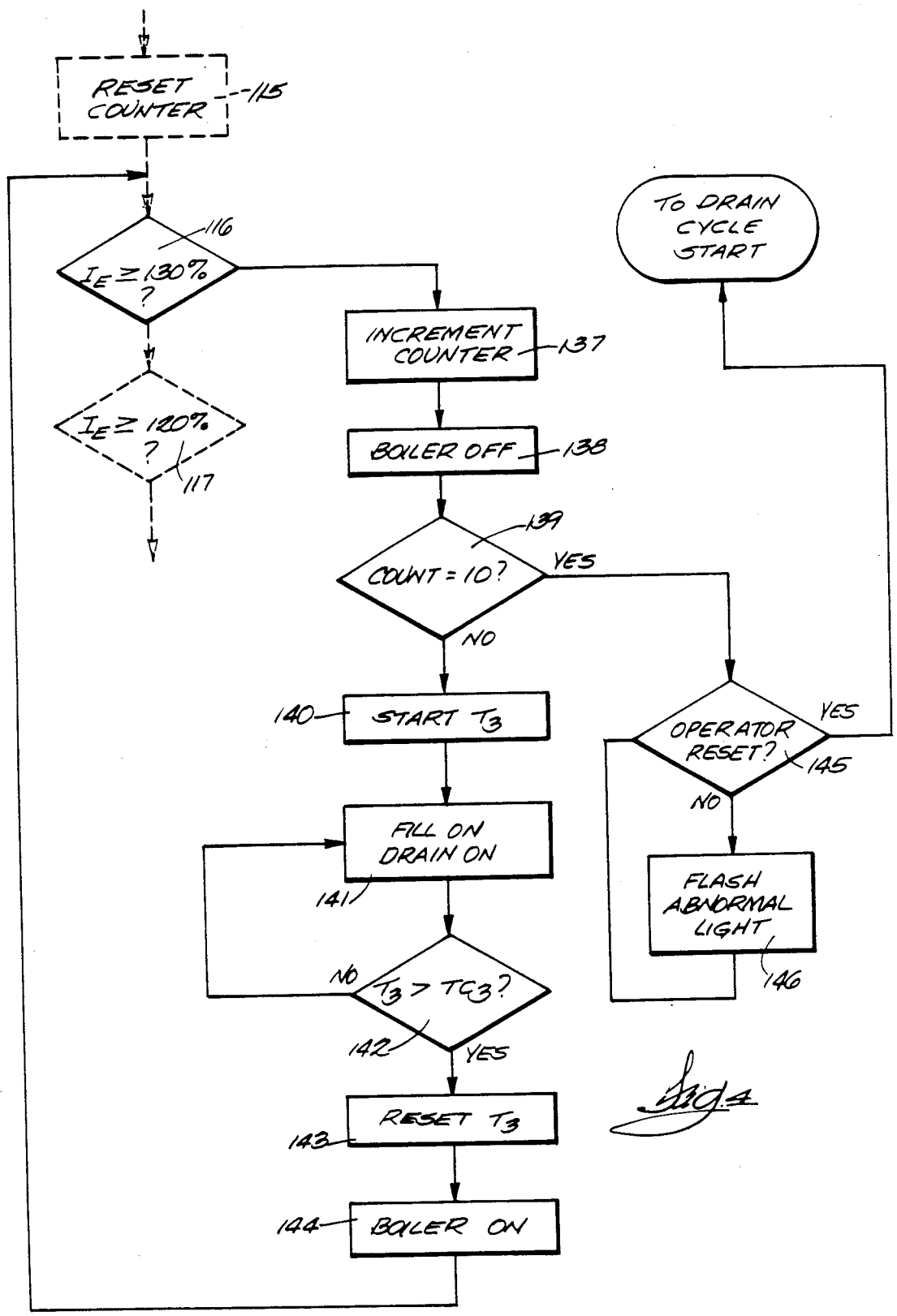

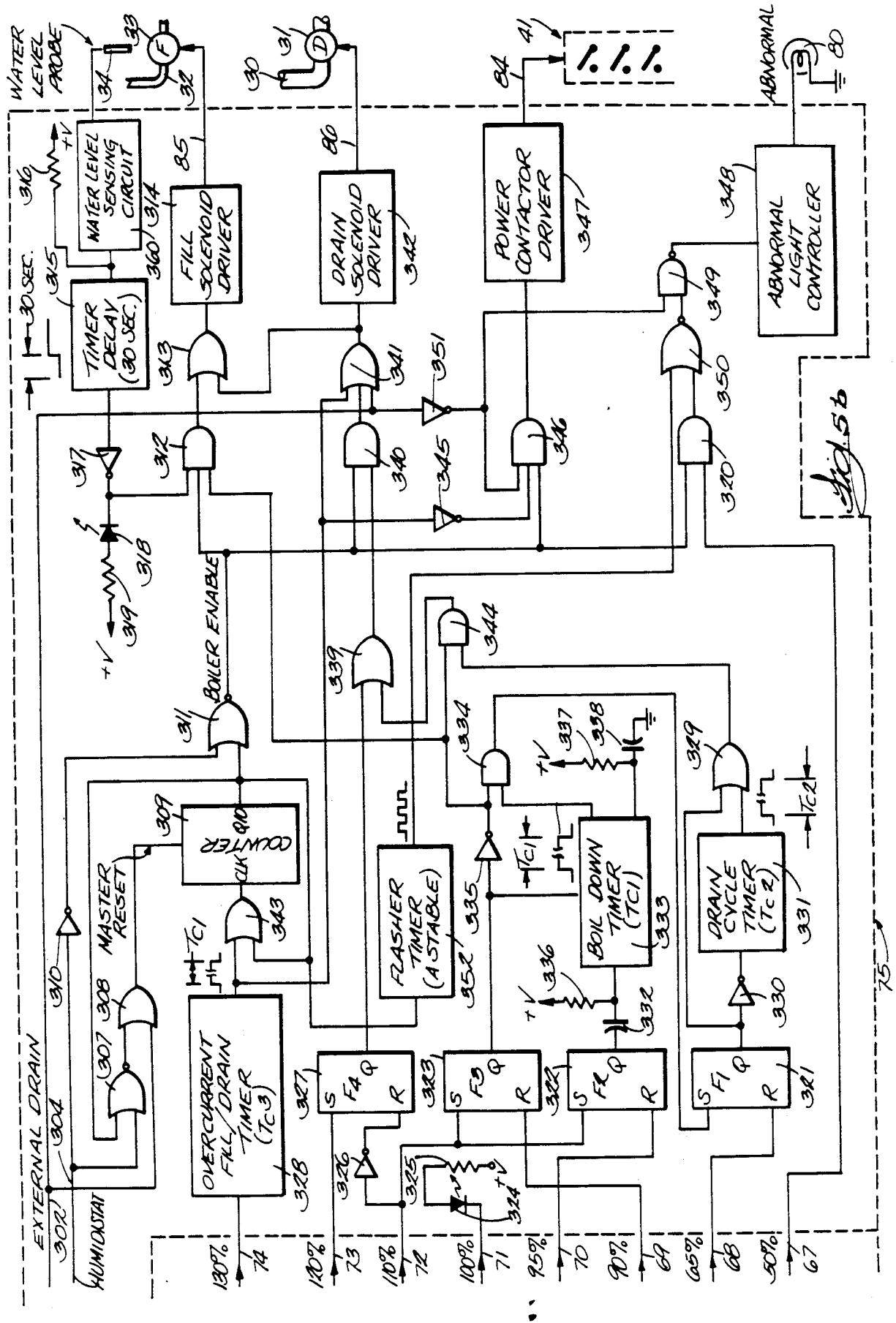

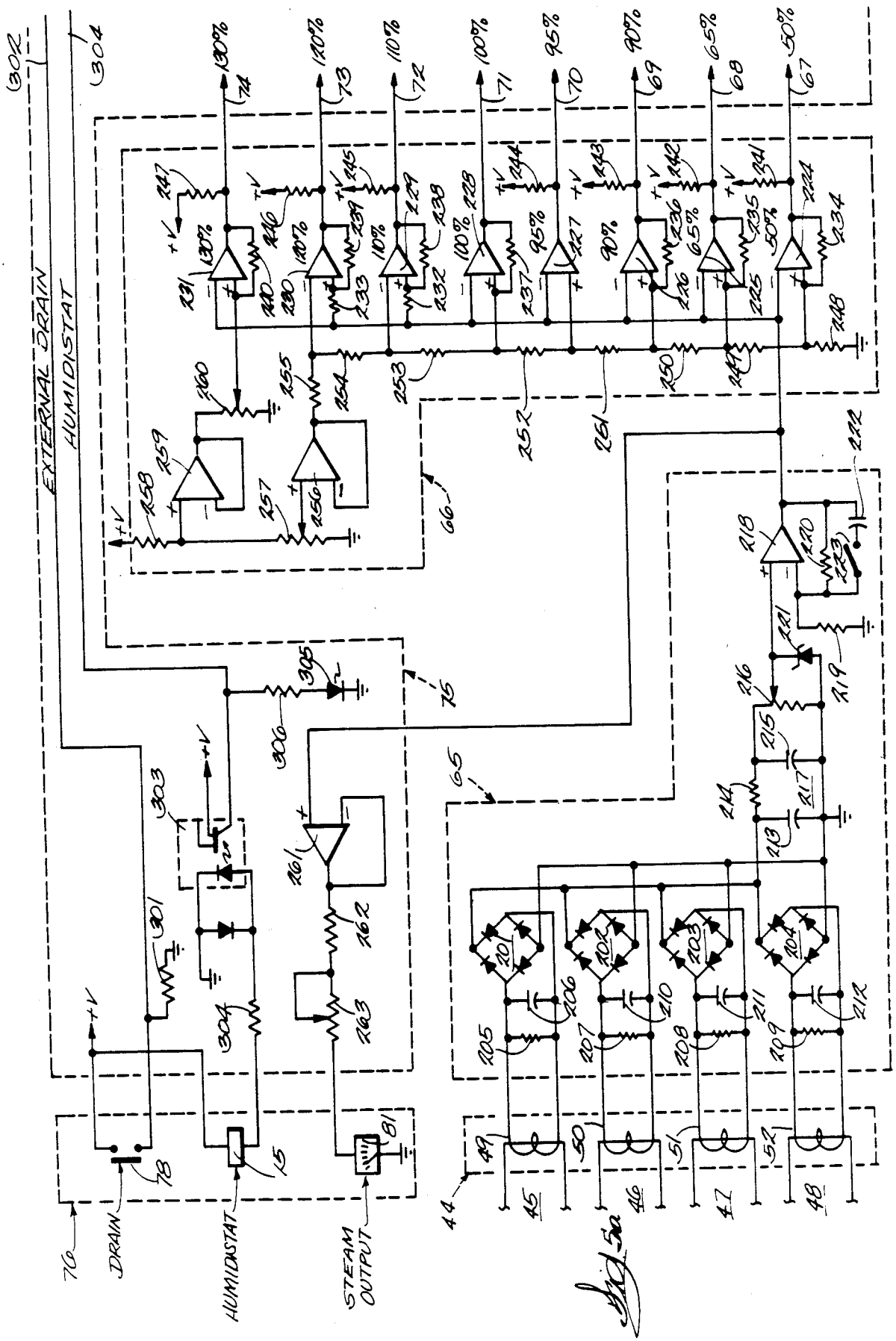

HUMIDIFIER CONTROLLER HAVING AUTOMATIC OVER-CURRENT CORRECTING MEANS

RELATED APPLICATION

Reference is made to U.S. Pat. No. 4,692,591, issued Sept. 8, 1987 to Cooley et al., entitled "Humidifier Controller Having Multiple-Phase Electrode Current Sensor," filed concurrently herewith and assigned to the assignee hereof.

BACKGROUND OF THE INVENTION

This invention relates generally to electrode boiler steam humidifier systems and more particularly to a humidifier controller wherein a corrective cycle is automatically initated when boiler electrode current exceeds a predetermined limit.

The electrode current drawn by the boiler of an electronic steam humidifier system is influenced by a number of factors, including, the quantity and conductivity of the water contained in the boiler, and the degree to which precipitate deposits have accumulated within the boiler. Because these factors are continually changing, boiler electrode current typically varies as the humidifier system operates. Since the instantaneous boiler electrode current can be indicative of the general condition of both the boiler and of the water contained therein, various humidifier controllers have been developed wherein system operation is controlled in response to the instantaneous electrode current drawn by the boiler.

In one prior humidifier controller, which is described in U.S. Pat. No. 4,262,191, issued Apr. 14, 1981 to Lepper et al., additional water is admitted into the boiler when the boiler electrode current drops below a predetermined minimum normal current level. As the water level within the boiler rises, the electrode current increases. When the current rises to a predetermined maximum normal current level, the admission of additional water into the boiler is terminated. As the water is converted to steam, the electrode current drops until the predetermined minimum normal current level is once again reached whereupon the cycle begins anew. System operation is thus such that a substantially constant average electrode current is maintained as the boiler is operated over a period of time.

Although the normal variations in boiler electrode current ordinarily occur gradually and steadily as the boiler is operated, the propensity for accumulated precipitates to suddenly dislodge from the boiler electrodes gives rise to random sudden increases in boiler electrode current. To prevent sustained operation at current levels well in excess of the maximum normal current level, the controller described in the aforesaid patent to Lepper et al. functions to automatically take corrective action by draining a portion of the boiler water over a time period of fixed duration, whenever the boiler electrode current exceeds a predetermined upper limit. By repeatedly draining a portion of the boiler water in this manner, the electrode current can usually be reduced to within the normal operating limits. However, because electrode current in excess of the predetermined upper limit can result from a variety of conditions which are uncorrectable merely through drainage of some of the water from the boiler, it is possible for the controller to enter a never-ending cycle of repeated attempts to drain still more water from the boiler.

In view of the foregoing, it is a general object of the present invention to provide a new and improved humidifier controller for controlling operation of an electrode boiler in accordance with the electrode current drawn thereby.

It is another object of the present invention to provide a humidifier controller wherein corrective action is taken when electrode current exceeds a predetermined upper current limit, but wherein repetitive futile attempts to reduce the electrode current are avoided in the event a predetermined number of such attempts prove ineffective in reducing the electrode current.

SUMMARY OF THE INVENTION

The invention is directed to a controller for controlling the operation of an electrode boiler steam humidifier. The controller includes a first control circuit which responds to the electrode current drawn by the electrode boiler to initiate a corrective cycle when the electrode current reaches a predetermined threshhold. A second control circuit responds to each initiation of the corrective cycle to disable operation of the electrode boiler when the successive initiation of a predetermined number of the corrective cycles fails to reduce the electrode current below the predetermined threshhold.

The invention is also directed to a controller for controlling the operation of an electrode boiler steam humidifier of the type wherein water can be admitted into, or drained from, the boiler, and wherein operating power can be selectively applied to the boiler. The controller includes a current sensor for sensing the electrode current drawn by the electrode boiler and for generating a control voltage to remove power, and drain water, from the boiler when the electrode current exceeds a predetermined threshhold. A counter is Provided for counting each successive occurrence of electrode current in excess of the predetermined threshhold. An inhibit circuit, responsive to the count in the counter, is provided for disabling operation of the electrode boiler when the count in the counter reaches a predetermined number. A reset circuit, responsive to actuation of either a humidistat or an external drain control switch, is provided for resetting the counter such that the predetermined count must be reached between successive actuations of either the humidistat or the external drain control switch before operation of the electrode boiler can be disabled by the inhibit circuit.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 3 is a flow-chart diagram, similiar to FIG. 2, depicting system operation in a normal and drain cycle operating mode.

FIG. 4 is a flow-chart diagram, similiar to FIGS. 2 and 3, showing system operation in an over-current control operating mode.

FIGS. 5a and 5b are simplified schematic and block diagrams of a humidifier controller embodying various features of th invention.

DESCRIPTION OF THE PREFERRED EMBODIMENT

Figure 1:
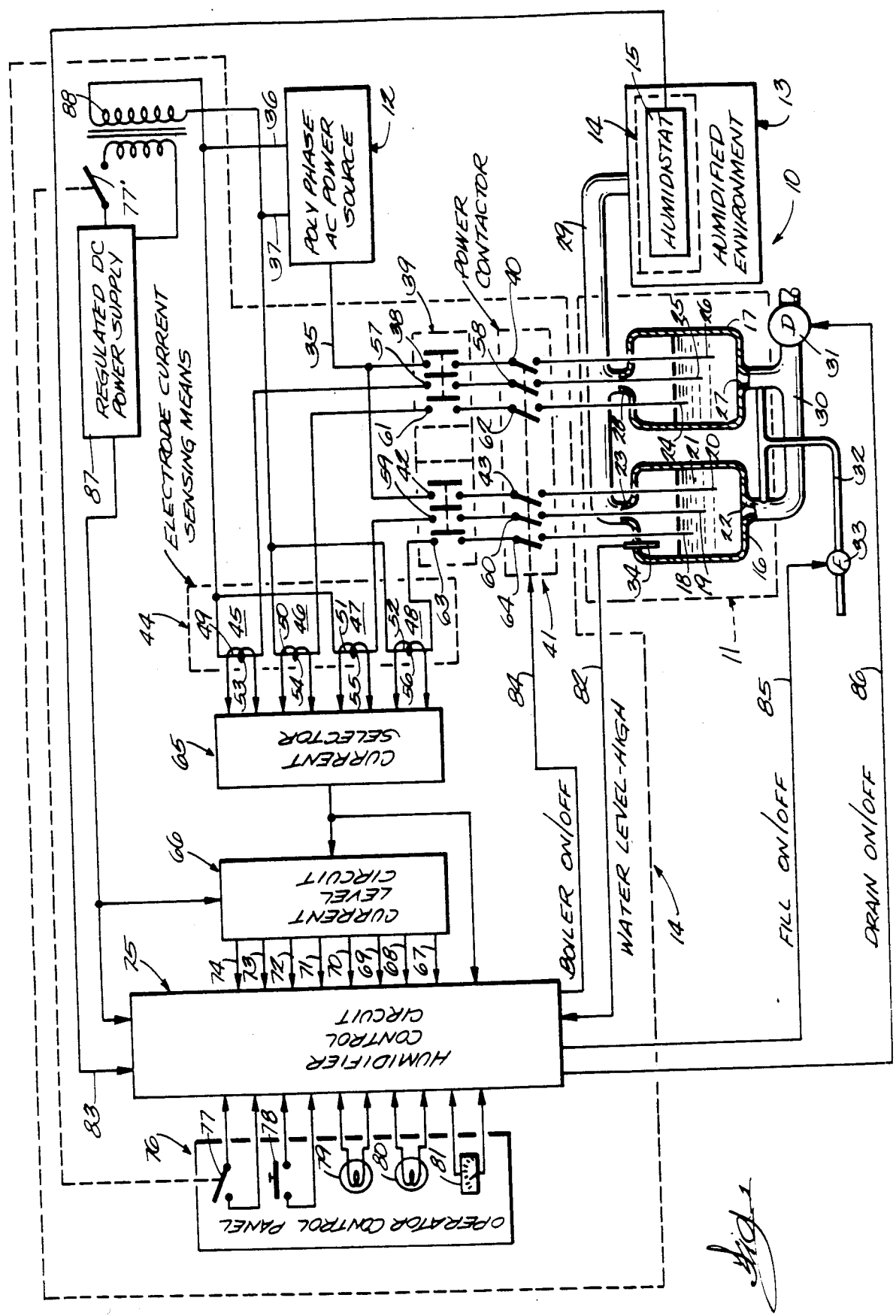
FIG. 1 is a functional block diagram of a humidifier system incorporating a humidifier controller constructed in accordance with the invention.

Referring to the drawings, and in particular to FIG. 1, an electronic steam humidifier system is illustrated and is generally designated by reference numeral 10. In accordance with conventional practice, humidifier system 10 includes an electrode boiler 11 which is operable from a source of polyphase alternating electrical current 12 to provide steam for humidifying a humidified environment 13. A humidifier controller 14, constructed in accordance with the invention, includes a humidistat 15 mounted within the humidified environment 13 and functions to control the operation of electrode boiler 11 such that a substantially constant desired humidity level is maintained in the humidified environment 13.

As illustrated, electrode boiler 11 includes a pair of boiler cylinders 16 and 17 of known construction. It will be appreciated, however, that the invention is also well-suited for use with electrode boilers having a greater or lesser number of cylinders. Boiler cylinder 16 is provided with three electrodes 18, 19 and 20 which become submerged when water 21 is admitted through an inlet/outlet port 22 provided adjacent the lower end of the cylinder. Steam, generated when electrical current is passed through the water between the electrodes, is discharged through a steam discharge port 23 formed adjacent the upper end of boiler cylinder 16. Boiler cylinder 17 is similarly constructed and includes electrodes 24-26, water inlet/outlet port 27 and steam discharge port 28.

As further illustrated in FIG. 1, the steam discharge ports 23 and 28 of boiler cylinders 16 and 17 are commonly connected to a steam conduit 29 which conveys the steam for ultimate dispersion into the humidifed environment 13. Water inlet/outlet ports 22 and 27 are each connected to a common drain conduit 30 having a single solenoid-controlled drain valve 31 which can be selectively opened or closed in accordance with whether water is to be drained from, or retained in, boiler cylinders 16 and 17. A common water inlet conduit 32, having a single solenoid-controlled fill valve 33, joins drain conduit 30 adjacent each of the water inlet/out ports 22 and 27. Fill valve 33 can be selectively opened and closed in accordance with whether additional water is to be admitted into boiler cylinders 16 and 17.

To avoid the introduction of extremely hot water into drain conduit 30, controller 14 preferably functions to open fill valve 33 whenever drain valve 31 is opened so that relatively cool water from inlet conduit 32 mixes with, and cools, the hot water discharged from cylinders 16 and 17. The water carrying capacities of inlet and drain conduits 32 and 30 are each selected such that an overall drain effect is achieved when fill valve 33 and drain valve 31 are simultaneously opened. If fill valve 33 is opened while drain valve 31 remains closed, the water level in each of the boiler cylinders 16 and 17 will rise.

In order to avoid over-filling cylinders 16 and 17, a high water level probe 34 extends into the interior of cylinder 16 adjacent its upper end. Ordinarily, when the water level within cylinder 16 is below the lowermost end of water level probe 34, the probe is electrically isolated from the water and, accordingly, no current passes through the probe to the humidifier control circuit. However, when the water level rises to the level of the probe, a current path is established from the probe to one or more of the electrodes 18, 19 or 20. Because of the common plumbing connection existing between cylinders 16 and 17 through conduits 30 and 32, the water levels in cylinders 16 and 17 will be essentially identical and, thus, a single high water level probe 34 can simultaneously control the water level in each of the boiler cylinders.

Operation of electrode boiler 11 is controlled by controller 14 which broadly functions to control the application of the polyphase alternating current from source 12 to boiler electrodes 18–20 and 24–26, and to control the operation of the fill and drain valves 33 and 31 in accordance with the humidity level set by humidistat 15. In accordance with one principal aspect of the invention, controller 14 also functions to monitor individual electrode current levels in boiler cylinders 16 and 17 and to assure that the operation of boiler 11 remains within certain predetermined operating limits. In particular, controller 14 functions to, first, sense the electrode current drawn by each of the boiler cylinders through each phase of the polyphase supply current provided by power source 12, next, select the highest of the sensed individual phase currents drawn by each boiler cylinder, and then, control operation of the boiler in accordance with the highest of the individual phase currents sensed in any of the boiler cylinders.

Three-phase alternating current for energizing the electrodes of boiler cylinders 16 and 17 is provided to controller 14 through three individual conductors 35, 36 and 37. Although a three-conductor, three-phase, alternating current power source 12 is shown, it will be appreciated that the invention is equally well-suited for use with electrode boilers operable from alternating current sources having additional current paths, circuits, and/or conductors.

As illustrated, conductor 35 is connected through one set of contacts 38 of an optional circuit breaker 39, and through one set of contacts 40 of a power contactor 41, to electrode 26 of boiler cylinder 17. Conductor 35 is also connected through a set of circuit breaker contacts 42 and power contactor contacts 43 to electrode 20 of boiler cylinder 16. To permit controller 14 to respond to the highest, individual, boiler electrode phase current, electrode current sensing means 44, for sensing the current provided to the electrode boiler 11 through each phase of the polyphase alternating electrical current, are provided in the form of a plurality of current loop transformers 45–48. Each of the current transformers includes a primary loop 49–52 and a secondary winding 53–56 on which an alternating current signal, indicative of current through the primary loop, is developed. It will be appreciated that in any three-phase, three-conductor, alternating current power system, the actual boiler current drawn in each of the three phases can be determined through measurement of the current in any two of the phases.

As further illustrated in FIG. 1, conductor 36 is coupled through transformer primary 49, a set of circuit breaker contacts 57 and a set of power contactor contacts 58, to electrode 25 of boiler cylinder 17. Conductor 36 is also coupled through transformer primary 51, circuit breaker contacts 59 and power contactor contacts 60 to electrode 19 of boiler cylinder 16. Similarly, conductor 37 is coupled through transformer primary 50, circuit breaker contacts 61 and power contactor contacts 62 to electrode 24 of boiler cylinder 17, and through transformer primary 52, circuit breaker contacts 63 and power contactor contacts 64 to electrode 18 of boiler cylinder 16. When so connected, secondary windings 53 and 54 of current transformers 45 and 46 each provide alternating current signals from which the individual phase currents drawn by electrodes 24–26 in boiler cylinder 17 can be determined. Similarly, secondary windings 55 and 56 of current transformers 47 and 48 provide an indication of the individual phase currents drawn through electrodes 18–20 of boiler cylinder 16.

To assure that controller 14 responds to the highest actual phase current drawn by either of the cylinder boilers 16 or 17, a current selector 65 is coupled to each of the transformer secondaries 53–56. Current selector 65, in a manner to be described more fully below, responds to each of the current-indicative AC signals induced in transformer secondaries 53–56 to provide a DC voltage which is indicative of the highest of the individual boiler electrode phase currents.

The DC current-indicative voltage developed by current selector 65 is applied to a current level circuit 66 which, in a manner to be more fully described below, provides a plurality of logic outputs, on respective control lines 67–74, indicative of the relative level of the highest phase current drawn in boiler cylinders 16 and 17. Preferably, the logic outputs on lines 67–74 express the highest phase current as a percentage of a user-adjustable nominal or "set-point" operating current $I_{sp}$.

In the example shown, output 67 is logic HIGH when the highest electrode phase current is less than substantially 50% of the normal set-point current $I_{sp}$, but becomes LOW when the phase current reaches or exceeds substantially 50% $I_{sp}$. Similarly, outputs 68, 69, 70 and 71 each undergo HIGH to LOW logic transitions when the highest of the sensed electrode phase current reaches and exceeds substantially 65%, 90%, 95% and 100% $I_{sp}$. Outputs 72, 73 and 74 each undergo LOW to HIGH logic transitions when the highest phase current reaches and exceeds substantially 110%, 120% and 130%, respectively, of the set-point current level.

To provide an appropriate control effect in accordance with the relative level of the highest phase current drawn in electrode boiler 11, controller 14 includes a humidifier control circuit 75 constructed in accordance with another principal aspect of the invention. Logic outputs 67–74 from the current level circuit 66 are applied to the humidifier control circuit 75 as is the current-indicative DC voltage developed by current selector 65. Controller 14 also includes an operator control panel 76 on which are mounted such user-actuable controls as a power "ON/OFF" switch 77, an external "DRAIN" switch 78 for draining boiler cylinders 16 and 17, an "ON" light 79 for indicating that the humidifier system is operating, an "ABNORMAL" light 80 for providing a visual indication of abnormal system operation and a "STEAM OUTPUT" meter 81 for providing a user-visible indication of the relative humidifier system steam output. Also coupled to the humidifier control circuit 75 are control inputs provided by the water level probe 34 on a control line 82, and the humidistat 15 on another control line 83.

In response to the various control inputs which it receives, humidifer control circuit 75, in a manner to be more fully described below, develops a plurality of control voltages on various control lines 84, 85 and 86, for controlling various aspects of the humidifier operation. Among these control voltages are a "BOILER ON/OFF" control signal, on control line 84, for controlling operation of power contactor 41, and "FILL" and "DRAIN ON/OFF" control outputs, on control lines 85 and 86 respectively, for controlling actuation of fill and drain valves 33 and 31. In addition, humidifier control circuit 75 provides appropriate outputs for actuating the "ON" and "ABNORMAL" lights 79 and 80 as well as the "STEAM OUTPUT" meter 81.

Electrical power for operating controller 14 is provided by a regulated DC power supply 87. A power transformer 88, having its primary coupled to one phase of the polyphase AC power source 12, provides reduced voltage alternating current for operating the regulated DC power supply 87 Switch contacts 77', operable with power "ON/OFF" switch 77, are provided in the secondary circuit of transformer 88 to control actuation of power supply 87.

Figure 2:
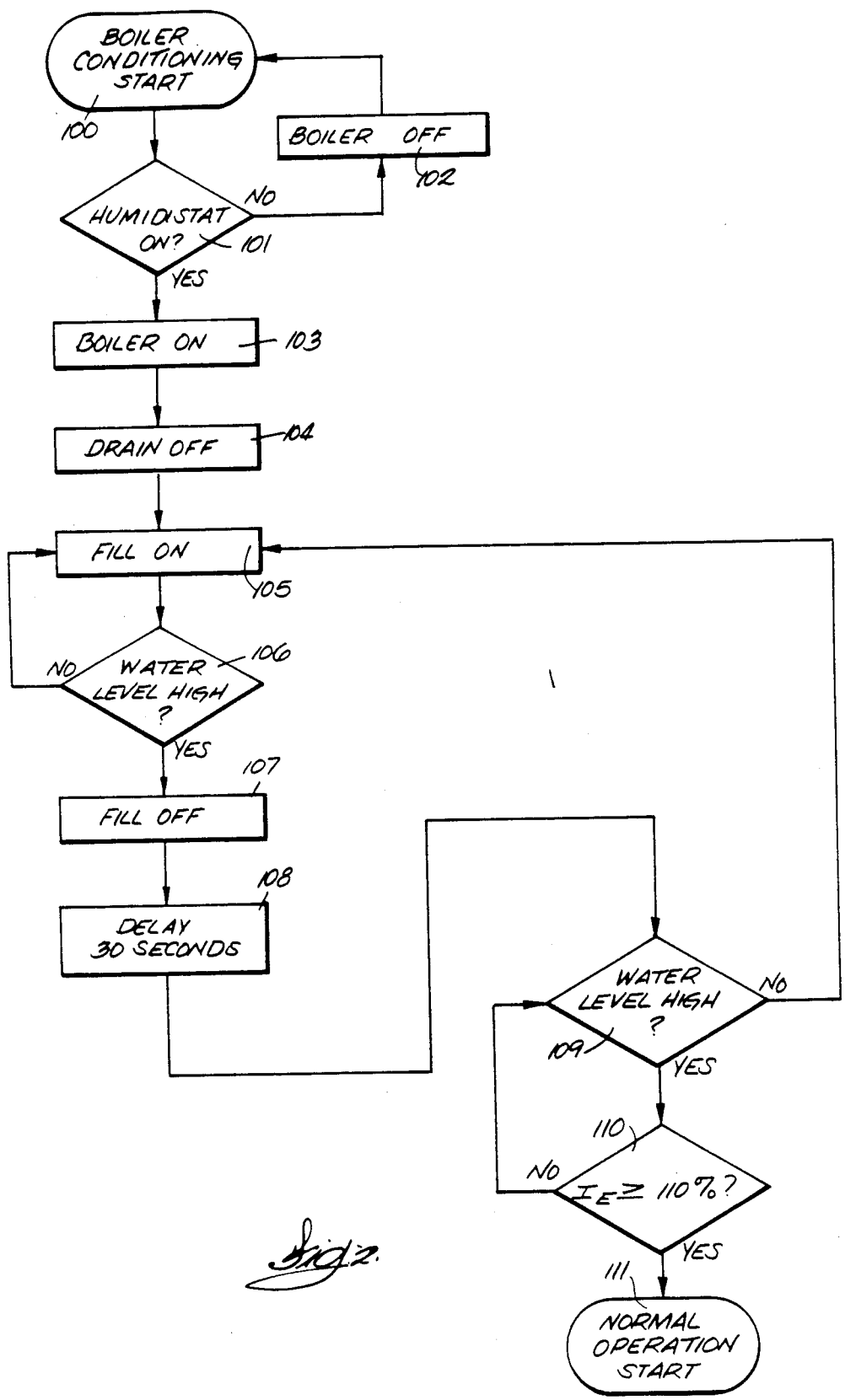
FIG. 2 is a flow-chart diagram useful in understanding operation of the controller, shown in FIG. 1, during initial operation of the humidifier system.

Operation of the humidifier system 10, and in particular the controller 14, can best be understood by reference to the system block diagram of FIG. 1 taken in conjunction with the system operating flow charts of FIGS. 2, 3 and 4. In the discussion which follows, system operation will be described beginning from a "cold start" wherein the boiler cylinders 16 and 17 are initially empty. At all times, the controller responds to the highest of the instantaneous, individual, phase currents sensed in either of the boiler cylinders 16 or 17. This highest electrode phase current is generally designated "$I_e$" and the various percentages refer to the relative level of $I_e$ expressed as a percentage of the nominal operating set-point current $I_{sp}$.

At any given moment, the magnitude of the boiler electrode current $I_e$ is determined by the water level within boiler cylinders 16 and 17, which affects the amount of electrode surface area in contact with the water, and by the concentration of "minerals" and other impurities in the boiler water, which affects water conductivity. When system operation begins with the boilers empty, the relatively LOW conductivity of the water supplied to the boiler cylinders through water inlet conduit 32 limits the initial electrode current $I_e$ such that maximum operating efficiency cannot be attained. Therefore, when the boiler cylinders 16 and 17 are initially filled, it is desirable to "condition" the cylinders by operating boiler 11 so as to increase the concentration of impurities and thereby raise the conductivity of the boiler water. To this end, controller 14 provides for operation in a "boiler conditioning" mode shown generally in FIG. 2.

At the start 100 of the "boiler conditioning" operating mode, the status of the humidistat is monitored at decision step 101. In the event the humidistat is off, indicating that no humidification is required, the boiler is maintained in a de-energized condition at step 102 and control returns to the cylinder conditioning start 100. Control operation continues in such an endless loop until such time as the humidistat is actuated, indicating that further humidification is required.

When the humidistat is on, power is applied to the boiler at step 103 and the solenoid-controlled drain valve 31 is closed at step 104. Solenoid-controlled fill valve 33 is opened at step 105 and the water level status, as indicated by the water level probe 34, is ascertained at 106. As long as no substantial current passes through the water level probe 34, indicating that the water within boiler cylinders 16 and 17 is below the level of the probe, fill valve 33 is kept open causing the water level in each of the boiler cylinders to rise. When the water level in boiler cylinder 16 reaches the level of the probe, fill valve 33 is closed at step 107.

In order to avoid chattering or excessive cycling of the fill valve 33, controller 14 provides a predetermined delay, following actuation of the water level probe 34 and closure of fill valve 33, during which further system response to actuation of the probe is inhibited. During the delay, which in the example shown, is of 30-seconds duration, turbulence and splashing within boiler cylinder 16 substantially subsides and false triggering of the water level probe 34 is substantially avoided.

Following expiration of the 30-second delay, the humidifier control circuit 75 becomes once again responsive to actuation of the water level probe. At step 109, the status of the probe is ascertained and, in the event the probe indicates a LOW water level, fill valve 33 is opened again and remains open until the water level probe is actuated once more. Operation in this mode continues until such time as a high water level continues to be indicated following expiration of the 30-second delay.

When this occurs, fill valve 33 remains off and, because power continues to be applied to the boiler, the water in boiler cylinders 16 and 17 eventually begins to boil. During this time, the system continues to monitor the boiler water level and, in addition, monitors the electrode current $I_e$ at step 110. As the water continues to boil, and thus be converted into steam, the boiler water level drops and eventually falls below the level of the water level probe. Fill valve 33 then opens until the probe once again indicates a high water level. A repetitive series of alternating fill and "boil-down" cycles thus results.

Because normal impurities, present within the boiler water, remain behind as the water is converted to steam, the concentration of impurities gradually increases with such continued boiler operation. Eventually, the conductivity of the water will increase to a point at which the electrode current $I_e$ rises to substantially 110% of the set-point current $I_{sp}$. When this occurs, cylinders 16 and 17 are considered to be "conditioned" and system operation passes from decision step 110 to the start step 111 of a "normal operation" mode illustrated in FIG. 3.

In the "normal operation" mode, the status of the humidistat continues to be monitored at step 112 and, if no humidification is required, the boiler is de-energized at step 113. In the event further humidification is called for, the boiler is energized at 114 and a counter, which is associated with operation in an "over-current control" mode (which will be more fully described below with respect to FIG. 4) is reset at 115. Next, the relative level of the electrode current $I_e$ is determined at step 116. In the event the electrode current $I_e$ is found to be equal to, or in excess of, 130% of the set-point current $I_{sp}$, the humidifier initiates operation in the previously-mentioned "over current control" mode.

In the event $I_e$ is found to be less than 130% $I_{sp}$, another decision is made at 117 in accordance with the relative level of $I_e$ with respect to 120% $I_{sp}$. In the event the electrode current equals or exceeds 120% $I_{sp}$, fill valve 33 and drain valve 31 are both opened at step 118 causing water to drain from each of the boiler cylinders 16 and 17. As the level of the water within boiler cylinders 16 and 17 drops, the total submerged surface area of electrodes 18–20 and 24–26 decreases and the electrode current $I_e$ drops accordingly. The fill and drain valves each remain open until such time as $I_e$ *drops to substantially* 110% $I_{sp}$ as determined at step 119. When this occurs, the fill and drain valves are both closed at step 120 to prevent further drainage of water from boiler cylinders 16 and 17.

From the foregoing, it will be apparent that the humidifer controller 14 responds to over-current conditions in either of two ways. In the event the electrode current exceeds 130% of the set-point current, operation in the "over-current control" mode results. In the event the electrode current is between 120% and 130% of the set-point current, water is drained from the boilers until the electrode current $I_e$ is forced down to substantially 110% of the set-point value. Once the fill and drain valves are closed at step 120, $I_e$ will continue to drop, albeit more slowly, as the boiler water is converted to steam. When $I_e$ drops to 90% $I_{sp}$, water is admitted to the boiler cylinders until $I_e$ rises to 110% $I_{sp}$.

Due, in part, to the steadily increasing water conductivity which results as water boils off and the concentration of impurities increases, and, in part, to the accumulation of precipitates or "scale" which effectively reduces the volumetric capacity of each boiler cylinder, the time required for the electrode current $I_e$ to drop from a first predetermined level to a second, lower, predetermined level becomes progressively shorter and shorter as boiler operation continues. Accordingly, the time required to "boil down" the electrode current $I_e$ between defined limits can provide an indication of the general condition of the boiler cylinders and of the water contained therein. Controller 14 is, therefore, provided with means for providing a control effect in response to the relative time required for the electrode current $I_e$ to decrease from a first predetermined level to a second, lower, predetermined level during operation of the electrode boiler.

Referring further to FIG. 3, following closure of the fill and drain valves at step 120, the controller next monitors the electrode current $I_e$ at step 121 to determine at what instant the electrode current is reduced to substantially 95% of the set-point current $I_{sp}$. When this occurs, a timer is triggered at 122 to begin the creation of a variable "Boil Down" time period $T_1$. Next, the electrode current $I_e$ is monitored at step 123 to determine the instant at which an electrode current level, equal to substantially 90% of the set-point current, is reached. When this occurs, the timer is stopped at 124 to terminate the time period $T_1$. It will be appreciated that variable time period $T_1$ represents the actual time required for the electrode current $I_e$ to "boil down" from 95% to 90% of the set-point current $I_{sp}$.

Following step 124, the boil down time period $T_1$ is compared, at step 125, against a constant, reference time period, $T_{c1}$ which represents the minimum time that would be required for the electrode current $I_e$ to decrease from 95% to 90% of the set-point current assuming normal boiler cylinder operation. Thus, the determination made at step 125 of whether the actual boil down period $T_1$ is greater than or less than the reference period $T_{c1}$ is indicative of whether the boiler cylinders are operating within normal limits.

In the event the boil down period $T_1$ is not less than constant period $T_{c1}$, normal cylinder operation is assumed and fill valve 33 is opened at step 26. As the water level within the boiler cylinders rises, more and more of the surface area of the boiler electrodes becomes submerged and the electrode current $I_e$ increases accordingly. During the time fill valve 33 remains open, the magnitude of the electrode current $I_e$ is monitored at step 127 while the status of the water level probe 34 is monitored at step 128. When either the electrode current $I_e$ reaches 110% of the set-point value, or the water level probe indicates that the boiler cylinders are full, fill valve 33 is closed at step 129 and system control returns to the "normal operation" start 111.

It will be appreciated that during normal humidifier operation, wherein the electrode current $I_e$ does not exceed 120% of the set-point current $I_{sp}$, and wherein the boil down Period $T_1$ is not less than the constant reference boil down period $T_{c1}$, boiler 11 will be operated such that the electrode current $I_e$ ranges between 110% and 90% of the set-point current. On the average, the actual steam output will be essentially that which would be produced by continuous operation at 100% of the nominal set-point value.

In the event it is determined, at step 125, that the actual boil down period $T_1$ is less than the reference period $T_{c1}$, the designed maximum water conductivity has been reached and measures are taken to reduce water conductivity. To this end, a drain cycle, indicated generally by reference numeral 130 in FIG. 3, is initiated.

Operation in the drain cycle mode begins with the simultaneous opening of the fill and drain valves 33 and 31 at step 131. At the same time, a timer is triggered at step 132 to initiate the generation of another variable time period $T_2$. As water drains from boiler cylinders 16 and 17, and as the boiler electrodes become increasingly exposed above the level of the water, the electrode current $I_e$ drops. Current $I_e$ is monitored at step 133 until such time as it decreases to substantially 65% of the nominal set-point current $I_{sp}$, at which time the elapsed period of the timer $T_2$ is compared against a predetermined constant time period $T_{c2}$ at step 134. In the event variable time period $T_2$ exceeds the predetermined constant period $T_{c2}$, the fill and drain valves are both closed at step 135, after which the $T_2$ timer is reset at 136. In the event T, does not exceed $T_{c2}$ at the time the electrode current $I_e$ drops to 65% of the set-point current, the fill and drain valves remain open until such time as $T_2$ exceeds $T_{c2}$. This assures that the fill and drain valves both remain open for the longer of the actual time ($T_2$) required for the electrode current to drop to 65% of the set-point current, or the constant predetermined time period $T_{c2}$. Following closure of the fill and drain valves, and resetting of the $T_2$ timer, the humidifier controller 14 initiates operation in the "boiler conditioning" mode shown in FIG. 2. As illustrated, the drain and fill valves can be manually opened through user-actuation of the external drain switch 78 to permit the user to drain the boiler cylinders when desired.

In the event the boiler electrode current $I_e$ reaches or exceeds 130% of the set-point current, the humidifier system operates in the "over-current control" mode illustrated in FIG. 4. Basically, operation in this mode includes de-energizing the power contacter 41 for a predetermined time period $T_{c3}$ during which time water is drained from the boiler cylinders 16 and 17. Upon expiration of the time period, the power contacter 41 (FIG. 1) is automatically re-energized. In the event repeated drainage of water from the boiler cylinders fails to correct the over-current condition, the boiler will be deactivated and the humidifier system will remain in an inactive state until reset by the user.

In order to implement the foregoing, the counter, which was reset during step 115 of the "normal operation" control cycle, is incremented at step 137 following the determination of an over-current condition at step 116. Next, power to the boiler is removed at step 138 and the count in the counter is compared against a predetermined, constant integer at step 139. In the event the count is less than the predetermined constant integer, which, in the example shown, is chosen to be ten, a timer is triggered at step 140 to define a variable time period $T_3$ and the fill and drain valves are opened at step 141. The time during which water is drained from the boiler is represented by the variable time period $T_3$ and is continuously compared against a predetermined constant time period $T_{c3}$ at step 142. When boiler water has been drained for a period equal to $T_{c3}$, the timer is reset at step 143 and the boiler is re-energized at step 144. Following re-enerization of the boiler, operation returns to step 116 to determine whether the over-current condition has been corrected.

In the event the electrode current is less than 130% of the set-point current, control passes to step 117 and the humidifier system continues to operate in the normal mode. In the event the over-current condition persists, the counter is once again incremented at step 137, power to the boiler is removed at step 138, and an additional drain period is initiated. Eventually, a point will be reached at which either the electrode current has been reduced to less than 130% of the set-point current, or at which the count has reached the predetermined constant integer, signifying that a number of unsuccessful attempts to remedy the over-current condition have been made. In the event the count has progressed to such a point, the boiler remains deactivated, system operation reverts to an inactive stand-by mode at step 145, and the "ABNORMAL" light 80 is repeatedly flashed at step 146 to alert the user. The system remains in such an inactive mode until it is reset through user-actuation of the external drain switch 77.

It will be appreciated that, since the counter is reset at step 115 upon each actuation of the humidistat during normal system operation, the long term accumulation of over-current drain cycles is avoided. In this manner, system operation reverts to the inactive stand-by mode only when the over-current condition is detected ten consecutive times during any single actuation of the humidistat.

An actual humidifier controller embodying the invention is illustrated in the simplified schematic diagram shown in FIGS. 5a and 5b.

To provide a DC voltage which is indicative of the highest individual phase current drawn by either of the boiler cylinders, the current selector 65, shown in the lower left-hand corner of FIG. 5a, includes a plurality of solid state, full-wave bridge rectifiers 201–204 of known construction, having inputs individually coupled to the secondary windings 49–52 of current transformers 45–48 within the electrode current sensing means 44. Each of the bridge rectifiers 201–204 functions to rectify the AC signal induced in the transformer secondary winding to which it is connected and thereby provide a constant polarity voltage indicative of the current through the transformer primary. To prevent response to high frequency transient signal components, a loading resistor 205 and capacitor 206 are connected in parallel across the input terminals of bridge rectifier 201. Similar resistors 207–209 and capacitors 210–212 are connected in parallel across the inputs of bridge rectifiers 202–204 as illustrated.

As further illustrated in FIG. 5, the negative polarity outputs of bridge rectifiers 201–204 are connected to each other and to circuit ground, while the positive polarity output terminals of the rectifiers are connected to each other and to one end of a capacitor 213, the opposite end of which is connected to circuit ground. The positive polarity outputs of the bridge rectifiers are also connected to one end of a resistor 214, the other end of which is coupled through another capacitor 215 to circuit ground. A potentiometer 216 is connected in parallel across capacitor 215.

When so connected, resistor 214 and capacitors 213 and 215 form a filter circuit 217 which filters the constant polarity voltage appearing at the output of each bridge rectifier to provide a steady DC voltage which is indicative of the highest of the currents through the primaries of transformers 45–48. Because the outputs of the bridge rectifiers 201–204 are connected in parallel to each other and to the input of filter 217, the voltage applied to the input of the filter will be the highest of the individual voltages provided at the outputs of the rectifiers. Accordingly, the steady voltage appearing across potentiometer 216 will be indicative of the highest of the voltages provided by recitifers 201–204 and of the highest of the phase currents drawn by the boiler.

To provide a current-indicative voltage for use by the remainder of the humidifier controller, the current selector 65 further includes an operational amplifier 218 having its non-inverting input connected to the wiper of potentiometer 216 and having its inverting input coupled to circuit ground through a resistor 219. Gain is set by means of a feedback resistor 220 connected between the output and inverting input of current selector amplifier 218. To limit the maximum input voltage applied to the amplifier, a zener diode 221 is connected between the non-inverting input and circuit ground.

When connected as shown, the output of amplifier 218 will be a substantially steady DC voltage indicative of the maximum phase current sensed by the electrode current sensing means 44. As water boils in the immediate vicinity of the boiler electrode, the instantaneous electrode current may undergo rapid, minor, fluctuations. To avoid having such fluctuations appear at the output of amplifier 218, a damping capacitor 222 is connected in parallel across the feedback resistor 220. Preferably, a switch 223 is provided for electrically removing the damping capacitor during system calibration when damping is neither required nor desired.

From current selector 65, the current-indicative DC voltage is applied to the current level circuit 66 in order to facilitate generation of the logic outputs on lines 67–74 which indicate the relative level of the sensed electrode current $I_e$. Within the current level circuit 66, a plurality of voltage comparators 224–231 are provided. The output of current selector amplifier 218 is connected directly to the inverting inputs of comparators 224–228 and 231, and through resistors 232 and 233 to the non-inverting inputs of comparators 229 and 230. Each of the comparators 224–228 and 231 functions to provide a HIGH to LOW logic transition in response to the voltage at its inverting input exceeding a substantially constant reference voltage applied to its non-inverting input. Similarly, each of the comparators 229 and 230 functions to provide a LOW to HIGH logic transition when the voltage on its non-inverting input exceeds a substantially constant reference voltage applied to its inverting input. For purposes of circuit stabilization, feedback resistors 234–240 are connected between the outputs and non-inverting inputs of comparators 224–226 and 228–231 respectively. Pull-up resistors 241–247 are connected between the outputs of comparators 224–227 and 229–231 and the supply voltage +V.

In order to develop a plurality of unique reference voltages against which the output voltage of the current selector 65 can be compared, the current level circuit 66 includes a resistor voltage divider network comprising a plurality of serially connected resistors 248–255. An adjustable, constant, reference voltage is provided to the divider network by an operational amplifier voltage-follower 256, having its non-inverting input connected to the wiper of a potentiometer 257, which, in turn, is connected through an additional resistor 258 to the supply voltage +V. The reference voltage provided by voltage-follower 256 can be user-adjusted by potentiometer 257 and is applied to one end of the resistor divider through resistor 255. At the other end of the divider, resistor 248 is connected to circuit ground. When so connected, a plurality of substantially constant, progressively increasing, reference voltages are developed at the junctures of each of the resistors within the voltage divider. These reference voltages are individually applied to the remaining inputs of comparators 224–230. Thus, at any given setting of potentiometer 257, the reference voltage applied to comparator 224 will be somewhat less than that applied to 225, which, in turn, will be less than that applied to comparator 226 and so on. Accordingly, the logic outputs on lines 67–73 will be determined by the relative voltage level at the output of current selector amplifier 218 as compared to each of the unique reference voltages provided by the voltage divider. Ordinarily, potentiometer 257 is set such that the reference threshold applied to comparator 228 corresponds to the current selector output which results when the boiler electrode current equals the chosen set-point current. Preferably, the values of resistors 248–255 are selected such that comparators 224–230 individually respond at electrode currents corresponding to the various percentages shown in the figure. It will be appreciated, however, that other percentages can be selected.

Comparator 231, which provides a HIGH to LOW logic transition when the boiler current exceeds 130% of the set-point current, derives its reference voltage, not from the resistor voltage divider, but rather from an additional voltage-follower 259 having its output connected to a potentiometer 260. The non-inverting input of voltage-follower 259 is connected through resistor 258 to the supply voltage. The wiper of potentiometer 260 is connected to the non-inverting input of comparator 231. In this manner, the switching threshold of comparator 231 can be adjusted independently of the thresholds of comparators 224–230 and, accordingly, the set-point current can be user-adjusted without disturbing the setting of the 130% over-current threshold voltage comparator 231.

To provide an indication of the relative steam output, the voltage developed at the output of the current selector amplifier 218 is also applied to the non-inverting input of an operational amplifier voltage-follower 261 located within the humidifier control circuit 75. The output of voltage follower 261 is coupled through a fixed resistor 262 and variable resistor 263 to the steam output meter 81. Because the voltage at the output of amplifier 218 is indicative of the boiler electrode current $I_e$, meter 81 provides a relative indication of the boiler steam output. Variable resistor 263 provides for calibration of the meter circuit.

The construction and operation of the humidifier control circuit 75 can best be understood by further reference to FIGS. 5a and 5b. In the description which follows, circuit operation begins from a "cold start" in which boiler cylinders 16 and 17 are initially empty.

As system operation begins, it is assumed that the external drain switch 78, having one contact connected to the supply voltage +V and another contact connected through a resistor 301 to circuit ground, is open. Accordingly, the voltage on an "external drain" control line 302, which is connected to the ungrounded end of resistor 301, is low. Humidifier system operation begins when a pair of electrical contacts within humidistat 15 close and apply the supply voltage to the input of an optical isolator 303 through a current limiting resistor 304. When this occurs, the output of the optical isolator 303 switches so that the supply voltage is applied to a "humidistat" control line 304. A light-emitting diode (LED) 305 is coupled to humidistat line 304 through a current-limiting resistor 306 and provides a visual indication whenever the humidistat contacts are closed.

Referring now to FIG. 5b, closure of the humdistat contacts results in the application of the supply voltage to one input of a two-input NOR-gate 307, the output of which is connected to the input of a two-input OR-gate 308. Prior to the initial closure of the humidistat contacts, the LOW voltage, then present on humidistat line 304, caused the output of NOR-gate 307 to be HIGH. This had the effect of biasing the output of OR-gate 308 HIGH, with the further effect that a reset voltage was applied to the master reset input of an overcurrent control counter 309. As a result, counter 309 was reset and the voltage at counter output $Q_{10}$, coupled to the remaining input of NOR-gate 307, was driven LOW. Assuming, now, that the external drain switch 78 remains open, closure of the humidistat contacts causes the output of OR gate 308 to go LOW thereby enabling counter 309.

The humidistat line 304 is also coupled through an inverter 310 to one input of a two-input NOR-gate 311, the remaining input of which is connected to counter output $Q_{10}$. When so connected, the output of NOR-gate 311 is HIGH so long as either the counter output $Q_{10}$ remains LOW, or the humidistat line 304 remains HIGH. In the event either of these conditions changes, the output of NOR-gate 311 goes LOW. Within humidifier control circuit 75, the output of NOR-gate 311 is used as a "boiler enable" control signal for enabling operation of the boiler except whenever either, the humidifier contacts open, or the $Q_{10}$ output of counter 309 is LOW.

To this end, the output of NOR-gate 311 is connected to one input of a three-input AND-gate 312, the output of which is connected to one input of a two-input OR-gate 313. The ottput of OR-gate 313 is connected to a fill solenoid driver 314 which develops an appropriate current for opening fill valve 33 in response to the occurrence of a HIGH logic voltage at the output of OR-gate 313. Preferably, fill solenoid driver 314 includes an optical coupling device (not shown) in order to provide DC isolation between the relatively low voltage circuitry of control circuit 75 and the relatively high voltage circuitry of solenoid valve 33.

As further illustrated in FIG. 5b, water level probe 34 is connected through a water level sensing circuit 360 to the trigger input of a 30-second delay timer 315. A pull-up resistor 316 is connected between the input of the timer 315 and the supply voltage +V. When the water level within boiler cylinder 16 is below the level of the water level probe 34, the output of timer 315, which is coupled through an inverter 317 to one of the remaining inputs of AND-gate 312, is LOW. Accordingly, the inverted output applied to AND-gate 312 is HIGH. Assuming, for the moment, that the remaining third input of gate 312 is HIGH at this time, closure of the humidistat contacts, and the resulting generation of the boiler-enable control voltage, results in the production of HIGH logic voltages at the outputs of gates 312 and 313 with the further effect that fill valve 33 is opened. Water then enters boiler cylinders 16 and 17 until the water level probe 34 is reached at which time timer 315 is triggered causing its inverted output to go LOW and thereby disable AND-gate 312. Fill valve 33 then closes and remains closed during the time the timer is enabled and opens once again following expiration of the 30-second delay. In the event the water level remains at the level of probe 34, timer 315 remains actuated and fill valve 33 remains closed.

To provide a visual indication that the water in the boiler cylinders has reached the level of the water level probe, an LED 318 and current limiting resistor 319 are serially connected between the output of inverter 317 and the supply voltage. LED 318 is actuated to provide the visual indicalion when the output of inverter 317 is LOW.

Referring now to the lefthand portion of FIG. 5b, control line 67, which undergoes a HIGH to LOW logic transition when the electrode current reaches or exceeds 50% of the set-point current, is connected to one input of a two-input AND-gate 320, the remaining input of which is connected to the output of NOR-gate 311. Control line 68, which undergoes a similar logic transition when the electrode current reaches 65% of the set-point level, is connected to the "reset" input of a first RS flip-flop 321. Control lines 69 and 70, which each undergo HIGH to LOW logic transitions in response to the electrode current $I_e$ reaching 90% and 95%, respectively, of the set-point current, are connected to the "reset" inputs of a pair of additional RS flip-flops 322 and 323. Control line 71, which undergoes a similar transition when the boiler electrode current reaches the set-point level $I_{sp}$, is connected to the cathode of an LED 324, the anode of which is coupled through a current limiting resistor 325 to the supply voltage. Control line 72, which undergoes a LOW to HIGH logic transition when the electrode current reaches 110% of the set-point level, is connected to the set inputs of flip-flops 322 and 323, and through an inverter 326 to the "reset" input of still another RS flip-flop 327. The "set" input of flip-flop 327 is connected to control line 73 which undergoes a LOW to HIGH logic transition when the electrode current reaches 120% of the set-point current, while control line 74, which undergoes a HIGH to LOW transition upon the electrode current reaching 130% of the setpoint level, is coupled to the trigger input of an overcurrent fill/drain timer 328.

As illustrated, the Q output of flip-flop 321 is connected to one input of a two-input OR-gate 329 and is coupled through an inverter 330 to the trigger input of a drain cycle timer 331 which provides a logic HIGH pulse, of constant duration $T_{c2}$, at its output upon the occurrence of a LOW to HIGH logic transition at the Q output of flip-flop 321. Accordingly, the output of OR-gate 329 will be HIGH whenever the Q output of flip-flop 321 is HIGH, or during a time period, equal in duration to $T_{c2}$, following the resetting of flip-flop 321.

The Q output of flip-flop 322 is coupled through a capacitor 332 to the trigger input of a "boil down" timer 333, the output of which is connected to one input of a two-input AND-gate 334. The Q output of flip-flop 323 is connected to the enable input of boil down timer 333 and is coupled through an inverter 335 to the remaining input of AND-gate 334. A pull-up resistor 336 is connected between the trigger input of boil down timer 333 and the supply voltage +V.

When flip-flop 322 is reset, its Q output undergoes a HIGH to LOW logic transition. By virtue of capacitor 332 and pull-up resistor 336, a short duration, logic LOW, trigger pulse is applied to the trigger input of timer 333 when this occurs. If timer 333 is enabled by the presence of a logic HIGH voltage at the Q output of flip-flop 323, a logic HIGH control pulse of constant duration $T_{c1}$ is produced at the timer output. If the timer is not enabled, as would be the case when flip-flop 323 is in a reset condition, the timer is insensitive to the application of trigger pulses and its output remains LOW regardless of the appearance of such trigger Pulses. The duration $T_{c1}$ of the timer output is determined by the respective values of a resistor 337 and capacitor 338 associated with the timer. The output of AND-gate 334 is connected to the "set" input of flip-flop 321.

Referring further to FIG. 5b, the Q output of flip-flop 327 is coupled to one input of a two-input OR-gate 339 whose output is connected to one input of a two-input AND-gate 340. The output of AND-gate 340 is connected to one input of a three-input OR-gate 341 whose output is connected to the remaining input of OR-gate 313 and to the enable input of a Drain Solenoid driver 342 which can be similar or identical to Fill Solenoid driver 314 in construction and operation. As so connected, it will be appreciated that, since the output of OR-gate 341 is connected to an input of OR-gate 313, fill valve 33 will open whenever drain valve 31 is opened. However, because of the additional control path provided through the other input of AND-gate 312, fill valve 33 can be opened independently of drain valve 31.

The over-current fill/drain timer 328 provides a logic HIGH output pulse of constant duration $T_{c3}$, when the electrode current $I_e$ reaches or exceeds 130% of the set-point current $I_{sp}$. This output is connected to one input of a two-input OR-gate 343 having its output connected to the clock input (CLK) of counter 309. The remaining input of OR-gate 343 is connected to the $Q_{10}$ output of the counter. The counter is thus incremented upon each operation of the over-current timer and, when the count reaches ten, OR-gate 343 functions to maintain a HIGH logic voltage on the clock input of the counter and thereby prevent any further advance in the count. Accordingly, the $Q_{10}$ output remains HIGH until the counter is reset and the "boiler enable" output of NOR-gate 311 goes LOW to disable further boiler operation.

When system operation begins from a cold start with the boiler cylinders empty, the boiler electrode current $I_e$ will begin at zero and will increase as the water level within the boiler cylinders rises. Because, at this time, the boiler current is LOW, the logic outputs on control lines 67–74 are such that flip-flops 321–322, 323 and 327 are each reset and their Q outputs driven LOW. When the humidistat contacts close, and water is admitted to the boiler cylinders, flip-flop 321 is enabled as $I_e$ reaches 65% $I_{sp}$, but remains in a reset condition until such time as the output of AND-gate 334 goes HIGH. The Q output of flip-flop 321 remains LOW and, the output of OR-gate 329 remains LOW provided the drain cycle timer 331 is not triggered.

As boiler electrode current rises to 90% of the set-point value, flip-flop 323 is enabled. However, since the current has not yet reached 110% of the set-point value, the Q output of flip-flop 323 remains LOW and boil down timer 333 remains disabled. Since the output of the boil down timer is thus necessarily LOW, the output of AND-gate 334 is LOW and flip-flop 321 remains reset.

When boiler current rises to 95% of the set-point value, flip-flop 322 is enabled and, like flip-flop 323, remains reset until boiler current rises to 110% of the set-point value.

When boiler current rises to 100% of the set-point value, LED 324 is biased on to provide a visual indication.

When current reaches 110% of the set-point level, flip-flop 327 is enabled, but remains in a reset condition, while flip-flops 322 and 323 are each "set" causing their respective outputs to go HIGH. This has the effect of enabling boil down timer 333 but, since a LOW to HIGH transition at the Q output of flip-flop 322 has no effect on the trigger input of the boil down timer, the timer output remains LOW as does the output of AND-gate 334. Flip-flop 321 thus remains in a reset condition at this time.

When boiler current reaches 110% of the set-point value and thereby "sets" flip-flop 323, the output of inverter 335, which is connected to AND-gate 334 and to one of the remaining inputs of three-input AND-gate 312, goes LOW to disable AND-gate 312 and thereby close fill valve 33. With AND-gate 312 disabled, no further water can be admitted to the boiler cylinders regardless of the water level indicated by the water level probe 34 and accordingly, the water level within the boilers drops as the water is converted to steam. This, in turn, results in a decrease in the boiler electrode current.

When the electrode current drops to 95% of the set-point level, flip-flop 322 is reset causing a HIGH to LOW transition to occur at its Q output. This, in turn, provides a trigger pulse to the now enabled boil down timer 333 which generates the $T_{c1}$ reference pulse at its output. However, since the output of inverter 335 remains LOW so long as flip-flop 323 remains set, the output of AND-gate 334 remains unchanged at this time.

When the boiler current drops to 90% of the set-point level, flip-flop 323 is reset causing its Q output to go LOW with the result that the output of inverter 335 goes HIGH and with the further result that the AND-gate 334 is enabled. The output of AND-gate 334, however, is dependent on the relative time at which the 90% current level is reached.

In the event the 90% current level is reached prior to the expiration of the $T_{c1}$ time period, AND-gate 334 will be enabled at some point during the time period over which the output of the boil down timer is HIGH. This results in the development of a logic HIGH pulse at the output of AND-gate 334 which has the effect of setting flip-flop 321 and triggering drain cycle timer 331.

When this occurs, a pulse, having a duration equal to the constant minimum drain time period $T_{c2}$ is provided at the output of OR-gate 329 and is applied to one input of a two-input AND-gate 344. The output of AND-gate 344 is connected to the remaining input of two-input OR-gate 339. The remaining inpu of AND-gate 334 is connected to the output of inverter 335 and, because the output of the inverter is, at this time, HIGH, a pulse having a duration equal to $T_{c2}$ is provided at the output of OR-gate 339. This pulse is coupled through AND-gate 340 and OR-gate 341 to the fill and drain solenoid drivers 314 and 342 with the result that a drain cycle, equal in duration to the constant minimum drain time period $T_{c2}$, is initiated. Following expiration of the $T_{c2}$ time period, the output of OR gate 329 goes LOW to once again close the fill and drain valves. Thus, it is seen that, in the event the time required for the boiler electrode current to boil down from 95% to 90% of the set-point current level is less than the predetermined reference period $T_{c1}$, a drain cycle equal in duration to a second predetermined period $T_{c2}$ is provided.

In the event the 90% current level is reached after expiration of the $T_{c1}$ reference time period, flip-flop 323 will not be reset until after the output of the boil down timer once again goes LOW following expiration of the $T_{c1}$ time period. Accordingly, when the output of inverter 335 goes HIGH in response to flip-flop 323 being reset, no set pulse is applied to flip-flop 321 and the drain cycle is not initiated. When flip-flop 323 is reset in response to the boiler current reaching 90% of the set-point level, the transition at the output of inverter 335 once again enables AND-gate 312 causing fill gate 33 to once again open. Water is once again admitted into the boiler cylinders until such time as the boiler current rises to 110% of the set-point level and the cycle begins anew. It will thus be appreciated, that during normal system operation, the boiler electrode current will ordinarily range between 90% and 110% of the set-point level.

After water has been admitted to the boiler cylinders, and the system has been in operation for some time, it is not unusual for various precipitates and deposits to accumulate on the boiler electrodes. When the humidifier contacts open, and power to the boiler cylinders is removed, the boiler cylinders cool and the resulting temperature change can cause portions of the accumulated deposits to become dislodged from the electrodes. This results in greater exposure of the electrodes to the boiler water and a large, sudden, increase in boiler electrode current upon the next closure of the humidistat contact. In the event this occurs to such an extent that the electrode current equals or exceeds 130% of the set-point current, the over-current fill/drain timer 328 is triggered causing the count in timer 329 to be advanced.

The output of the over-current timer is also applied to one of the remaining inputs of the three-input OR-gate 341. A logic HIGH at the output of timer 328 thus functions to open the fill and drain valves resulting in a drain cycle equal in duration to the period $T_{c3}$. The output of timer 328 is still further applied through an inverter 345 to one input of a three-input AND-gate 346. The output of AND-gate 346 is connected to the input of a power contactor driver 347 which, when enabled, energizes power contactor 41 to provide power to the boiler cylinders. A LOW logic output from inverter 345 in response to triggering of the over-current timer 328 disables AND-gate 346 to disable power contactor 41 and thereby remove power from the boiler cylinders. Accordingly, in response to a 130% over-current condition, power is removed, and water is drained, from the boiler cylinders for a period equal in duration to constant time period $T_{c3}$.

In the event the drainage of water from the boiler cylinders is insufficient to remedy the over-current condition, over-current timer 328 is once again triggered to repeat the over-current drain cycle. In the event ten consecutive attempts to remedy the over-current condition are made, the count in counter 309 advances to $Q_{10}$ causing OR-gate 343 to latch the counter into a static mode and causing the output of NOR-gate 311 to go LOW with the result that each of the boiler cylinders is disabled. This latched condition will persist until such time as a master reset signal is provided to the counter 309.

In the event the drain cycle is sufficient to lower the electrode current $I_e$ to less than 130%, but greater than 120%, of the set-point level, the output of timer 328 will remain LOW while flip-flop 327 is set causing the Q output of the flip-flop to go HIGH. This has the effect of rendering the outputs of gates 339, 340 and 341 HIGH with the further effect that water is drained from the boiler cylinders. When the electrode current level drops to 110% of the set-point level, flip-flop 327 is reset, causing its Q output to go LOW, with the further effect that the fill and drain valves close. Accordingly, the humidifier controller operates to force the boiler electrode current down to 110% of the set-point level whenever an over-current condition occurs, or, if this cannot be accomplished, removes power from the boiler and conditions the system for operation in a stable, inactive, mode.

To provide a user-visible indication when the humidifier system is operating in an abnormal mode, an abnormal light controller 348, which preferably comprises an optically-coupled current switching device, is coupled to the "ABNORMAL" light 80 and functions to switch the "ABNORMAL" light on whenever a logic HIGH voltage is provided to its enable input. To this end, the enable input of the abnormal light controller 348 is connected to the output of a two-input NAND-gate 349 having one of its inputs connected to the output of a two-output NOR-gate 350. The "external drain" control voltage, which appears on control line 302, is coupled through an inverter 351 to the remaining input of NAND-gate 349, while the remaining input of NOR-gate 350 is coupled to the output of an astable flasher timer 352 which is enabled by the occurrence of a HIGH output on the $Q_{10}$ output of counter 309. In the event the count in counter 309 advances to produce a logic HIGH voltage at the $Q_{10}$ output of the counter, timer 352 is enabled causing a plurality of periodic logic pulses to be applied to the NOR-gate 350. Provided the external drain switch 78 remains open at this time, the application of these periodic pulses to NOR-gate 350 will cause the "ABNORMAL" light 80 to flash. This alerts the operator as to the occurrence of the uncorrected over-current condition.

As previously noted, external drain switch 78 allows the user to manually drain water from the boiler cylinders when desired. When switch 78 is closed, and a logic HIGH voltage is applied to control line 302, the output of OR gate 341 is driven HIGH to open fill and drain valves 33 and 31, while the outPut of inverter 351 is driven LOW to disable AND-gate 346 and de-energize power contactor 41, thereby removing power from the boiler cylinders. The output of inverter 351 also causes the output of NAND-gate 349 to go HIGH with the further result that the "ABNORMAL" light 80 remains continuously on while switch 78 is closed.

As deposits continue to accumulate, the volume of water which can be contained in the boiler cylinders is gradually reduced. Eventually, it is possible for the accumluation to progress to a point at which normal boiler electrode operating currents cannot be obtained even though the water level has risen to the maximum level permitted by the water level probe 34. When the maximum obtainable electrode current falls to less than 50% of the normal set-point current $I_{sp}$, the "ABNORMAL" light 80 is turned on to signify that the boiler cylinders have reached the ends of their useful lives. To this end, AND-gate 320 is enabled by the LOW to HIGH logic transition which occurs on control line 67 when the boiler electrode current drops to less than 50% of the set-point current. With AND-gate 320 so enabled, its output goes HIGH when the boiler enable control signal is generated at the output of NOR-gate 311, with the further effect that the "ABNORMAL" light 80 lights.

While a particular embodiment of the invention has been shown and described, it will be obvious to those skilled in the art that changes and modifications may be made without departing from the invention in its broader aspects and, therefore, the aim in the appended claims is to cover all such changes and modifications as fall within the true spirit and scope of the invention.

We claim:

1. A controller for controlling the operation of a steam humidifier having an electrode boiler, said controller comprising:
    first control means responsive to the electrode current through the electrode boiler for initiating a corrective cycle whe the electrode current exceeds a predetermined thereshold;
    second control means responsive to initiation of said corrective cycle for disabling operation of the electrode boiler when the successive initiations of a predetermined number of said corrective cycles fails to reduce the electrode current below said predetermined threshold; and
    third control means responsive to the electrode current for measuring the time required for the electrode current to decrease between an upper predetermined substantially constant current level and a lower predetermined substantially constant current level and for providing a control effect when said time is less than a predetermined time period.

2. A controller as defined in claim 1 wherein said electrode current ranges between a maximum normal current limit and a minimum normal current limit during normal operation of the elctrode boiler and wherein said upper predetermined substantially constant current level is lower than said maximum normal current limit and wherein said lower predetermined substantially constant current level is no less than said minimum normal current limit.

3. A controller as defined in claim 2 wherein the electrode boiler contains water and said control effect includes the removal of at least a portion of the water from the boiler when said time is less than said predetermined time period.

4. A controller for controlling the operaiton of a steam humidifier having an electrode boiler and a humidistat operable when actuated to actuate the electrode boiler, said controller comprising:
    first control means responsive to the electrode current drawn by the electrode boiler for automatically initiating a corrective cycle when the electrode current exceeds a predetermined thereshold indicative of an undesired over-current condition;
    counter means for counting successive intiations of said corrective cycle;
    second control means responsive to the count in said counter means for disabling operation of said electrode boiler when said count reaches a predetermined number;
    rest means responsive to actuation of the humidistat for resetting the count in said counter means to an initial count lower than said predetermined number in response to actuation of the humidistat and for resetting said second control means to enable operation of the electrode boiler; and
    third control means responsive to the electrode current for measuring the time required for the electrode current to decrease between an upper predetermined substantially constant current level and a lower predetermined substantially constant current level, and for providing a control effect when said time is less than a predetermined time period.

5. A controller as defined in claim 4 wherein the electrode current ranges between a maixmum normal current limit and a minimum normal current limit during normal operation of the electrode boiler and wherein said upper predetermined substantially constant current level is, lower than said maximum normal current limit and wherein said lower predetermined substantially constant current level is no less than said minimum normal current limit.

6. A controller as defined in claim 5 wherein the electrode boiler contains water and said control effect includes the removal of at least a portion of the water from the boiler when said time is less than said predetermined time peirod.

7. A controller for controlling the operation of an electronic stream humidifier system, including an electrode boiler, a plurality of electrodes in said electrode boiler, a humidistat, a source of alternating current, a power contactor for coupling the electrodes of the electrode boiler to the source of alternating current in response to actuation of the humidistat, a solenoid controlled drain fill valve for admitting water into the electrode boiler and a solenoid controlled valve for draing water from the electrode boiler, said controller comprising:
    current sensing means including a current transformer for providing a variable voltage indicative of the electrode current drawn by the electrodes of the electrode boiler;
    a voltage comparator for comparing said current indicative voltage aganist a predetermined reference voltage to generate a first control voltage when the electrode current exceeds a predetermined maximum electrode current;
    a timer rsponsive to generation of said first control voltage for developing a second control voltage of substantially constant finite duration upon each generation of said first control voltage;
    a drain valve solenoid driver coupled to said timer and operable to open the solenoid controlled drain valve upon development of said second control voltage to drain water from the boiler for a peirod of time substantially equal in duration to the duration of said second control voltage;

a counter responsive to the generation of said first control voltage for counting successive occurrences of the electrode current exceeding said predetermined maximum electrode current;

a power contactor driver coupled to the power contactor and responsive to he count in said counter for decoupling the boiler electrodes from the source of alternating current when said count reaches a dredetermined number;

reset means responsive to actuation of the humidistat for resetting the count in said counter to an initial number lower than said predetermined count upon actuation of the humidistat such that said power contactor driver decouples the boiler electrodes from the source of alternating current when the count in said counter reaches said predetermined number between successive actuations of the humidistat; and means responsive to the electrode current for measuring the time required for said electrode current to decrease between an upper predetermined substantially constant current level and a lower predetermined substantially constant current level, and for providing a control effect when said time is less than a predetermined time period.

8. A controller as defined in claim 7 wherein said electrode current ranges between a maximum normal current limit and a mimimum normal current limit during normal operation of the electrode boiler and wherein said upper predetermined substantially constant upper current level is lower than said maiximum normal current limit and wherein said lower predetermined substantially constant current level is no less than said minimum normal current limit.

9. A controller as defined in claim 8 wherein the electrode boiler is operated such that substantially constant average current is drawn when alternating current is coupled to the electrode boiles, and wherein said upper current level is substantially 95% of said averge current and said lower current level is subtantially 90% of said average current.

10. A controller as defined in claim 9 wherein said maximum normal current limit is substantially 110% of said average current level and said minimum normal current limit is substantially 90% of said average current level.

11. A controller as defined in claim 10 wherein the electrode boiler contains water and said control effect includes the removal of at least a portion of the water from the boiler when said time is less than said predetermined time period.

* * * * *